(12) United States Patent

Hall

(10) Patent No.: US 12,629,770 B1

(45) Date of Patent: May 19, 2026

(54) SYSTEMS AND ADAPTERS FOR A WELDING MACHINE

(71) Applicant: United Launch Alliance, L.L.C., Centennial, CO (US)

(72) Inventor: Jordan M. Hall, Danville, AL (US)

(73) Assignee: United Launch Alliance, L.L.C., Centennial, CO (US)

( * ) Notice: Subject to any disclaimer, the term of this patent is extended or adjusted under 35 U.S.C. 154(b) by 189 days.

(21) Appl. No.: 17/953,159

(22) Filed: Sep. 26, 2022

(51) Int. Cl.
  B23K 20/26 (2006.01)
  B23B 51/12 (2006.01)

(52) U.S. Cl.
  CPC .............. B23K 20/26 (2013.01); B23B 51/12 (2013.01)

(58) Field of Classification Search
  None
  See application file for complete search history.

(56) References Cited

U.S. PATENT DOCUMENTS

| | | | | | |
|---|---|---|---|---|---|
| 2,491,605 A | * | 12/1949 | Chittenden | ......... | B23B 31/1071 |
| | | | | | 279/82 |
| 3,829,108 A | * | 8/1974 | Zapart | ................... | B23B 31/202 |
| | | | | | 279/49 |
| 4,121,847 A | * | 10/1978 | Morawski | ........... | B23B 31/4033 |
| | | | | | 279/2.04 |
| 5,726,420 A | * | 3/1998 | Lajoie | .................... | B23K 9/173 |
| | | | | | 219/137.61 |
| 6,075,227 A | * | 6/2000 | Lajoie | .................... | B23K 9/123 |
| | | | | | 219/137.61 |

| | | | | | |
|---|---|---|---|---|---|
| 7,176,412 B2 | * | 2/2007 | Wells | ........................ | B23K 9/32 |
| | | | | | 219/137.61 |
| 7,334,970 B2 | * | 2/2008 | Kozak | ................... | B25B 21/007 |
| | | | | | 7/165 |
| 8,439,369 B2 | * | 5/2013 | Haimer | ............... | B23B 31/1179 |
| | | | | | 279/23.1 |
| 9,004,498 B2 | * | 4/2015 | Haimer | ............... | B25B 13/5008 |
| | | | | | 279/42 |
| 9,586,268 B2 | * | 3/2017 | McCluskey | ........... | B23B 31/102 |

(Continued)

FOREIGN PATENT DOCUMENTS

| | | |
|---|---|---|
| CN | 106891089 | 6/2017 |
| CN | 108188564 | 6/2018 |

(Continued)

OTHER PUBLICATIONS

"FSW Head for CNC machines 3, 4 or 5 axes," Stirweld, 2021, 28 pages [retrieved online Oct. 1, 2021 from: stirweld.com/en/stirweld-products/fsw-head/].

(Continued)

*Primary Examiner* — Devang R Patel

(74) *Attorney, Agent, or Firm* — Sheridan Ross P.C.

(57) ABSTRACT

Systems and adapters for a welding machine are provided. The system may include an adapter having a first end and a second end; a collet holder at the first end; a flange positioned between the collet holder and the second end; a first body portion positioned between the collet holder and the flange; and a second body portion positioned between the flange and the second end. The system may also include a collet receivable in the collet holder and configured to hold a tool. The adapter may be further receivable in and selectively securable to a welding head of the welding machine, thereby enabling the welding machine to use the tool.

18 Claims, 7 Drawing Sheets

(56) References Cited

U.S. PATENT DOCUMENTS

| | | | | |
|---|---|---|---|---|
| 9,931,710 | B2 | | 4/2018 | Becker et al. |
| 10,016,838 | B2 | | 7/2018 | Katoh et al. |
| 10,076,791 | B2 * | | 9/2018 | Schenk ............... B23B 31/1071 |
| 10,710,189 | B2 * | | 7/2020 | Jansma .................. B23K 9/164 |
| 10,799,980 | B2 * | | 10/2020 | Packer .............. B23K 20/1255 |
| 2021/0121977 | A1 | | 4/2021 | Rosal et al. |
| 2023/0249279 | A1 * | | 8/2023 | Sevestre ............. B23K 20/122 |
| | | | | 228/112.1 |

FOREIGN PATENT DOCUMENTS

| | | | | | |
|---|---|---|---|---|---|
| CN | 108202181 | A | * | 6/2018 | |
| CN | 207840395 | | | 9/2018 | |
| CN | 109834467 | A | * | 6/2019 | |
| CN | 209998551 | | | 1/2020 | |
| CN | 210306235 | | | 4/2020 | |
| CN | 213196088 | | | 5/2021 | |
| DE | 102019001298 | | | 8/2020 | |
| EP | 3389913 | B1 | * | 4/2020 | ........... B23K 20/125 |

OTHER PUBLICATIONS

"HYBRID Multi-Tasking," Mazak Corporation, 2021, 4 pages [retrieved online Oct. 1, 2021 from: www.mazakusa.com/machines/ process/hybrid-multi-tasking/].

* cited by examiner

SYSTEMS AND ADAPTERS FOR A WELDING MACHINE

FIELD

The present technology is generally related to adapters and in particular, an adapter for enabling a welding machine to perform milling and/or drilling operations.

BACKGROUND

Friction stir welding tools are used to perform circumferential friction stir welds or repairs to cylindrical components or components with curved surfaces such as, for example, tanks. In particular, circumferential friction stir welding may be employed, for example, in the construction of spacecraft propellant tanks, where a cylindrical panel or panel assembly is welded to dome-shaped end pieces about an entire circumference of both the cylindrical panel/panel assembly and the dome to form the tank. During such use, close-out bolt operations may need to be performed to complete a circumferential friction stir weld. A conventional drilling adapter can be used to perform such tasks (e.g., close-out bolt operations) or to perform repairs, however, because the work piece is typically curved rather than planar, the use of conventional drilling adapters and techniques in automated processes frequently causes problems related to run-out (e.g. where the hole resulting from drilling is larger than the bit's nominal diameter due to eccentric/off-axis rotation of the bit). Hand or manual drilling by human technicians may mitigate these problems, but is labor-intensive and includes other risks or drawbacks, such as human error/misalignment, failure to ensure the drill bit is straight, leaving material in the drill area, "walking" of the drill bit, etc. Thus, it is desirable to have an adapter for a welding machine that is capable of performing other tasks such as drilling, milling, etc. on a curved surface.

SUMMARY

The techniques of this disclosure generally relate to enabling a welding machine to perform other tasks such as drilling, milling, etc.

A system for adapting a welding machine for at least one of drilling or milling according to at least one embodiment of the present disclosure comprises an adapter having a first end and a second end, the adapter having a collet holder at the first end, a flange positioned between the collet holder and the second end, a first body portion positioned between the collet holder and the flange, and a second body portion positioned between the flange and the second end; and a collet receivable in the collet holder, the collet configured to hold a tool, wherein the adapter is receivable in and selectively securable to a welding head of the welding machine, thereby enabling the welding machine to use the tool.

Any of the aspects herein, wherein the tool is at least one of a drill bit or an end mill. Any of the aspects herein, wherein the second body portion is cylindrical.

Any of the aspects herein, wherein the first body portion comprises a first diameter, the collet holder comprises a second diameter, and the flange comprises a third diameter, and wherein the third diameter is greater than the first diameter and the second diameter, and the first diameter is greater than the second diameter.

Any of the aspects herein, wherein the second body portion defines a receiving portion configured to be received by a receiver of the welding head, wherein the flange is configured to abut the welding head when the receiving portion is received by the receiver.

Any of the aspects herein, wherein the receiving portion has a fourth diameter and the fourth diameter is less than the first diameter.

Any of the aspects herein, wherein the second body portion is multi-sided.

Any of the aspects herein, wherein the first diameter is equal to the second diameter.

Any of the aspects herein, wherein the flange comprises one or more apertures, each aperture configured to receive a corresponding fastener, the fastener configured to selectively secure the adapter to the welding head.

Any of the aspects herein, further comprising a collet ring configured to releasably secure the collet to the collet holder.

Any of the aspects herein, wherein the collet holder has an outer surface and at least a portion of the outer surface is threaded, and wherein the collet holder has a cavity configured to receive the collet, and wherein the collet ring threads onto the outer threaded surface to releasably secure the collet to the collet holder.

Any of the aspects herein, wherein the cavity comprises a tapered surface.

A system for adapting a welding machine for drilling according to at least one embodiment of the present disclosure comprises an adapter having a first end and a second end, the adapter having a collet holder at the first end, an outwardly extending flange positioned closer to the first end than the second end, a first body portion between the flange and the collet holder, and a second body portion positioned between the flange and the second end; a collet receivable in the collet holder, the collet configured to hold a tool; and a collet ring configured to releasably secure the collet to the collet holder, wherein the second body portion defines a receiving portion configured to be received by a welding held of the welding tool, wherein the is adapter selectively securable to the welding head when the receiving portion is received by the welding head, thereby enabling the welding machine to use the tool, and wherein the flange is configured to abut the welding head when the adapter is selectively secured to the welding head.

Any of the aspects herein, wherein the second body portion is cylindrical.

Any of the aspects herein, wherein the first body portion defines a supporting portion comprising a first diameter, the collet holder comprises a second diameter, and the flange comprises a third diameter, and wherein the third diameter is greater than the first diameter and the second diameter, and first diameter is greater than the second diameter.

Any of the aspects herein, wherein the first diameter is equal to the second diameter.

Any of the aspects herein, wherein the second body portion defines a receiving portion having a fourth diameter and, wherein the fourth diameter is less than the first diameter.

Any of the aspects herein, wherein the second body portion defines a receiving portion having a fourth diameter and, wherein the fourth diameter is greater than the first diameter.

Any of the aspects herein, wherein the flange comprises one or more apertures, each aperture configured to receive a corresponding fastener, the fastener configured to selectively secure the adapter to the welding head.

A system for adapting a welding machine for drilling according to at least one embodiment of the present disclosure comprises a circumferential welder having a weld head configured to receive one or more welding tools; an adapter configured to be releasably secured by the welding head, the adapter having a first end and a second end, a collet holder at the first end, an outwardly extending flange positioned closer to the first end than the second end, a first body portion between the flange and the collet holder, and a second body portion positioned between the flange and the second end; a collet receivable in the collet holder, the collet configured to hold a tool; and a collet ring configured to releasably secure the collet to the collet holder, wherein the second body portion defines a receiving portion configured to be received by a welding head, wherein the is adapter selectively securable to the welding head when the receiving portion is received by the welding head, thereby enabling the welding machine to use the tool, and wherein the flange is configured to abut the welding head when the adapter is selectively secured to the welding head.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1-X_n$, $Y_1-Y_m$, and $Z_1-Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form. It is intended that the summary be read in combination with the more detailed description presented below together with the drawings. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
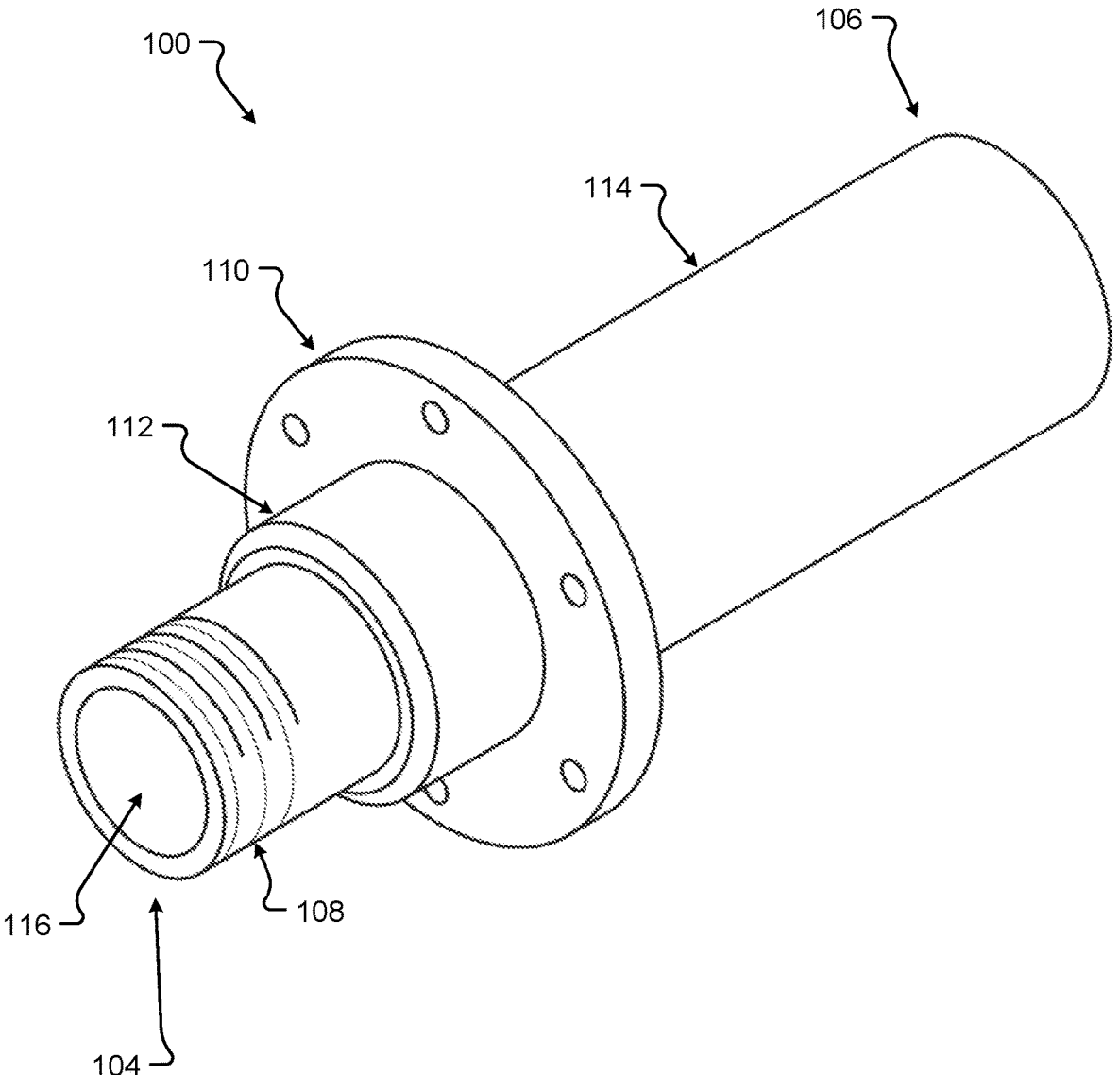
FIG. 1 is a perspective view of an adapter according to at least one embodiment of the present disclosure.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, an adapter and/or a welding machine.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The use of "substantially" in the present disclosure, when referring to a measurable quantity (e.g., a diameter or other distance) and used for purposes of comparison, is intended to mean within 5% of the comparative quantity. The terms "substantially similar to," "substantially the same as," and "substantially equal to," as used herein, should be interpreted as if explicitly reciting and encompassing the special case in which the items of comparison are "similar to," "the same as" and "equal to," respectively.

An adapter according to at least one embodiment of the present disclosure is provided. The adapter is configured to enable a welding machine typically used for circumferential welds to perform other tasks such as drilling, milling, etc. on various surfaces such as, for example, curved surfaces. The adapter comprises a collet holder machined into the end of the adapter and configured to hold a collet that can hold cutters, end mills, drill bits, and the like. The adapter is secured into the weld head of a friction stir welding tool via bolts and allows the friction stir welding tool to be utilized like a milling machine for precision cutting and hole drilling when not performing welds. This capability allows the friction stir welding tool to perform repairs and to meet engineering tolerances for performing close-out bolt operations, e.g. on circumferential friction stir welds. The adapter thus saves time and effort by, for example, transferring repair and close-out work from a human technician to a machine already employed to perform friction stir welding.

The adapter also eliminates problems associated with conventional adapters by adapting the collet to eliminate set screws and allow the weld head to be secured "flush" against the work piece. The flange of the adapter ensures this flush contact of the weld head to the work piece. In this way, eccentric or off-axis rotation of the cutter, end mill, drill bit, etc. can be reduced or eliminated. Moreover, because the adapter can be used in association with existing friction stir welding tools and systems, it may allow for automation of the drilling process using software like that used to automate the friction stir welding process, thereby eliminating the drawbacks of cutting/drilling by human technicians.

Turning first to FIG. 1, a perspective view of an adapter 100 is shown. The adapter 100 is receivable in and is configured to be selectively secured to a welding head 102 (shown in FIG. 7) of a welding machine. The adapter 100 enables the welding machine to operate a tool (e.g., a drill bit, an end mill, etc.) to perform a task other than welding such as, for example, drilling and/or milling. The adapter 100 extends from a first end 104 to a second end 106 and comprises a collet holder 108 at the first end 104; a flange 110 positioned between the collet holder 108 and the second end 106; a first body portion 112 positioned between the collet holder 108 and the flange 110; and a second body portion 114 positioned between the flange 110 and the second end 106. The flange 110 is positioned closer to the first end 104 than the second end 106, though in other embodiments the flange 110 may be positioned closer to the second end 106 than the first end 104 or at a mid-portion of the adapter 100. As shown, the collet holder 108 has an opening 116 for receiving a collet 118 (shown in FIG. 6).

The adapter 100 may be formed from a solid material such as, but not limited to, metal (e.g., steel, aluminum, titanium, etc.), plastic, or the like. The adapter 100 may be formed or machined as one piece, though it will be appreciated that in other embodiments the adapter 100 may be formed from multiple pieces coupled together.

Figure 2:
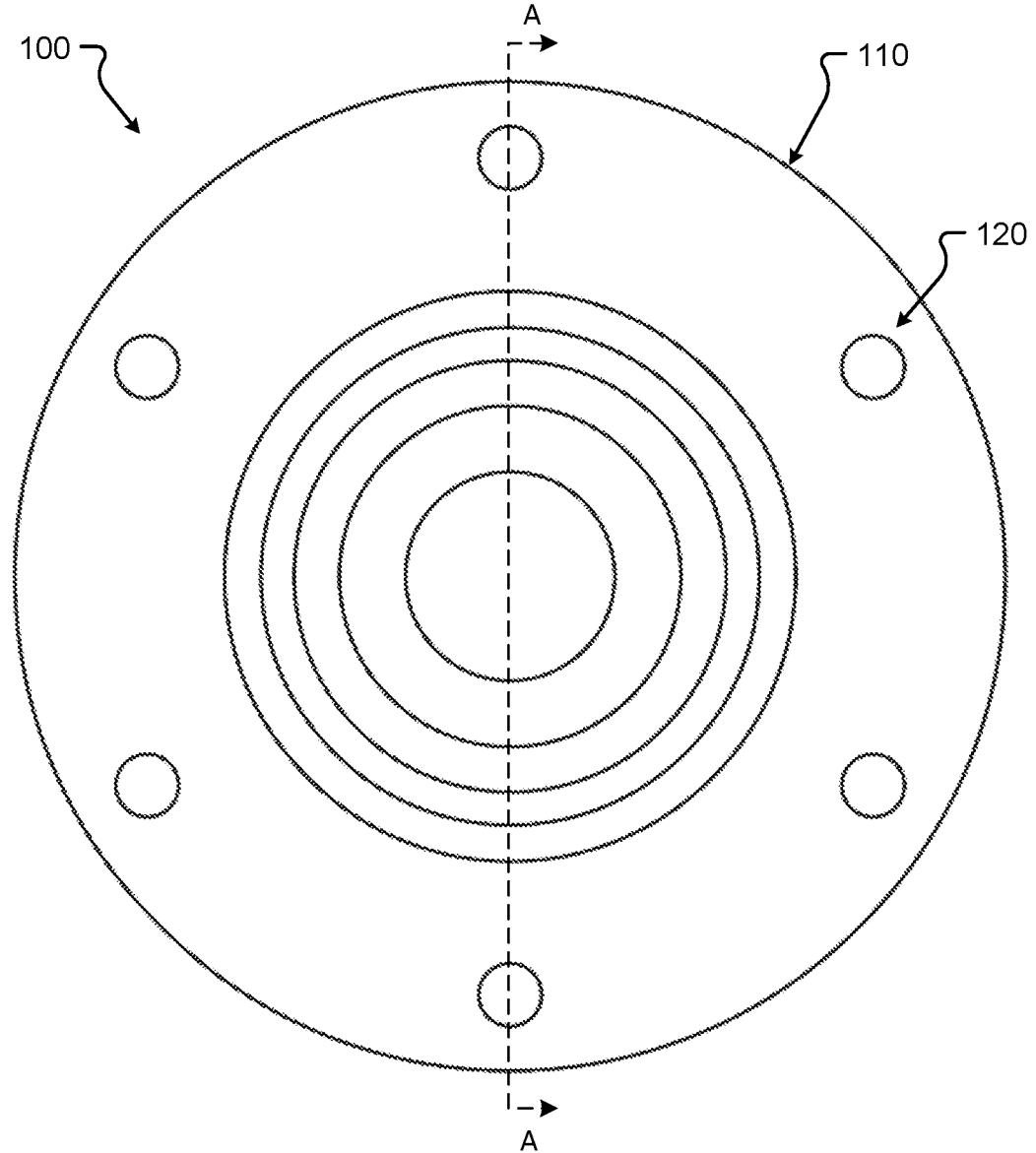
FIG. 2 is a front end view of an adapter according to at least one embodiment of the present disclosure.

Turning to FIG. 2, a front view of the adapter 100 is shown. The flange 110 comprises one or more apertures 120 and each aperture 120 is configured to receive a corresponding fastener 122 (shown in FIG. 7). The fastener 122 is configured to selectively secure the adapter 100 to the welding head 102. The fastener 122 may comprise, for example, bolts, screws, rivets, or the like. The fasteners 122 are removable such that the adapter 100 can be removed from the welding head 102, thereby enabling the welding head 102 to easily convert between welding and operating a tool. In the illustrated embodiment, the one or more apertures 120 comprise six apertures, though it will be appreciated that in other embodiments the one or more apertures 120 may comprise more or fewer than six apertures. Further, the one or more apertures 120 are equally radially spaced around a circumference of the flange 110 as shown in the illustrated embodiment. In other embodiments, the one or more apertures 120 may be radially spaced apart from each other in any pattern and may include one radial row, two radial rows, or more than two radial rows of apertures 120. In still other embodiments, the one or more apertures 120 may be formed to fit a bolt pattern of a particular welding held. Further, the flange 110 may have a thickness of about 0.27 inches, though in other embodiments, the flange 110 may have a thickness less than or greater than 0.27 inches. The thickness of the flange 110, a pattern of the one or more apertures 120, and/or a diameter (e.g., a third diameter D3, described in detail in FIG. 4) of the flange 110 may be adjusted or varied to fit different welding heads.

When the adapter 100 is positioned and/or secured in the welding head 102, the flange 110 is configured to abut the welding head 102. The flange 110 advantageously prevents run out by holding the adapter 100 in place to stay parallel to an axis of a weld arm and perpendicular to a workpiece. The flange 110 also enables the adapter 100 to have a shorter overall length, thereby using less material to manufacture the adapter 100 and providing a more compact adapter 100.

Figure 3A:
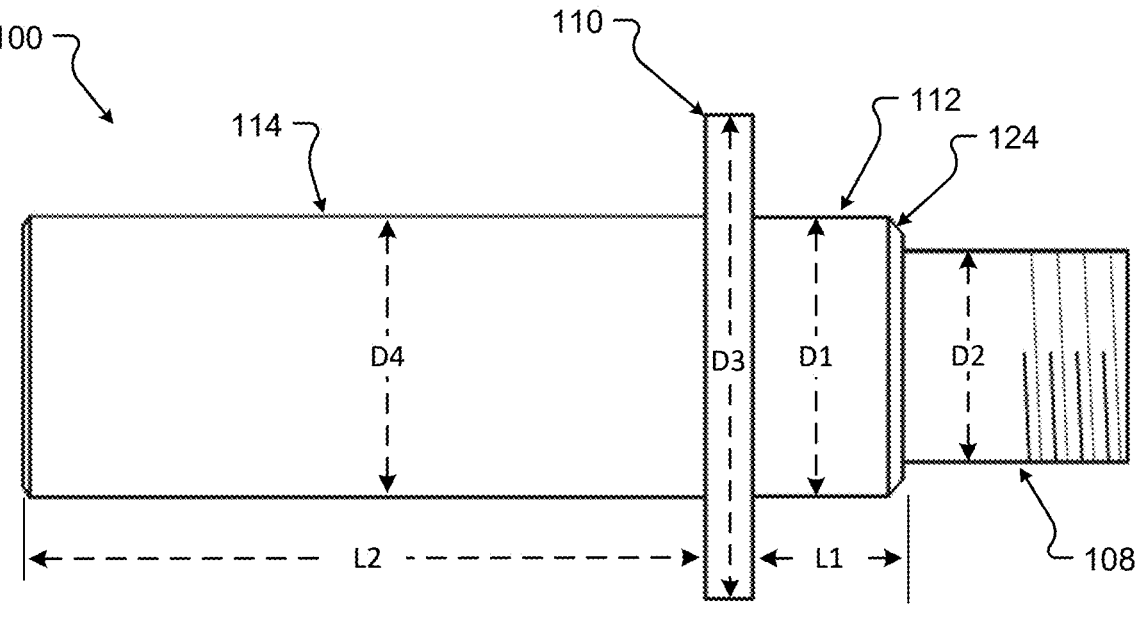
FIG. 3A is a side view of an adapter according to at least one embodiment of the present disclosure.
Figure 3B:
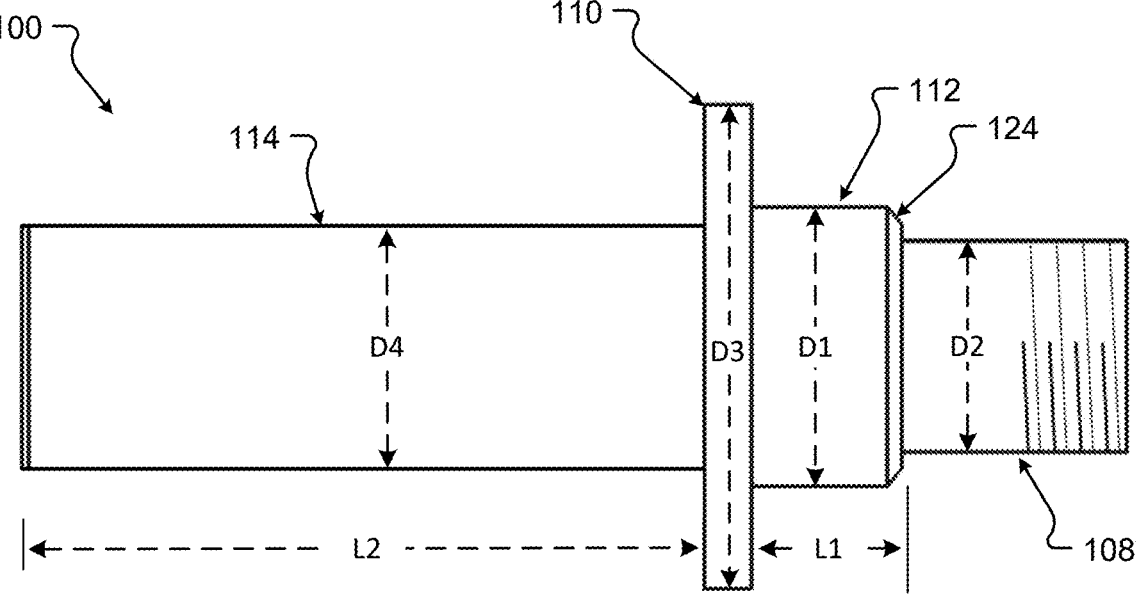
FIG. 3B is a side view of an adapter according to at least one embodiment of the present disclosure.

Turning to FIG. 3, a side view of the adapter 100 is shown. As previously described, the first body portion 112 extends between the collet holder 108 and the flange 110. As shown in the illustrated embodiment, an edge of the first body portion 112 may comprise a chamfer 124 though in other embodiments, the edge may be rounded, squared, or any other shape. The second body portion 114 extends between the flange 110 and the second body portion 114 is configured to be received by a receiver of the welding head 102. It will be appreciated that the first body portion 112 may be referred to as a supporting portion for supporting the collet holder 108 and the second body portion 114 may be referred to as a receiving portion for being received by the welding head 102.

In the illustrated embodiment, the first body portion 112 and the second body portion 114 are each cylindrical. In other embodiments, the first body portion 112 and/or the second body portion 114 may be any shape such as, for example, triangular, rectangular, pentagon, octogon, oval, oblong, or the like. Further, it will be appreciated that the first body portion 112 and/or the second body portion 114 may have multiple faces. A length L1 of the of the first body portion 112 is between about 1 inch and 1.2 inches, though it will be appreciated that in other instances the length L1 may be less than 1 inch or greater than 1.2 inches. A length L2 of the of the second body portion 114 is between about 4 inches and 4.2 inches, though it will be appreciated that in other instances the length L2 may be less than 4 inches or greater than 4.2 inches. Generally, the length L2 is greater than the length L1, though in other embodiments the length L2 may be equal to or less than the length L1.

In the illustrated embodiment, the first body portion 112 has a first diameter D1, the collet holder 108 has a second diameter D2, the flange 110 has a third diameter D3, and the second body portion 114 has a fourth diameter D4. It will be appreciated that the first diameter D1 and/or the second diameter D2 can be adjusted to accommodate different sizes and shapes of collets and fittings; the third diameter D3 can be adjust based on the welding held 102 and/or the fourth diameter D4; and the fourth diameter D4 can be adjusted based on a size of the receiver of the welding head 102. The third diameter D3 is greater than the first diameter D1, the second diameter D2, and the fourth diameter D4 and the first diameter D1 and the fourth diameter D4 are greater than the second diameter D2. Further, the first diameter D1 and the fourth diameter D4 are substantially equal. It will be appreciated that in other embodiments, the first diameter D1 and the fourth diameter D4 may be different and/or the second diameter D2 may be greater than the first diameter D1 and/or the fourth diameter D4. In some embodiments D1 is between about 1.5 inches and about 1.7 inches; D2 is between about 1.1 inches and about 1.3 inches; D3 is between about 2.9 inches and about 3.1 inches; and D4 is between about 1.5 inches and about 1.7 inches. In other instances, D1 may be less than 1.5 inches or greater than 1.7 inches; D2 may be less than 1.1 inches or greater than 1.3 inches; D3 may be less than 2.9 inches or greater than 3.1 inches; and D4 may be less than 1.5 inches or greater than 1.7 inches.

Figure 4:
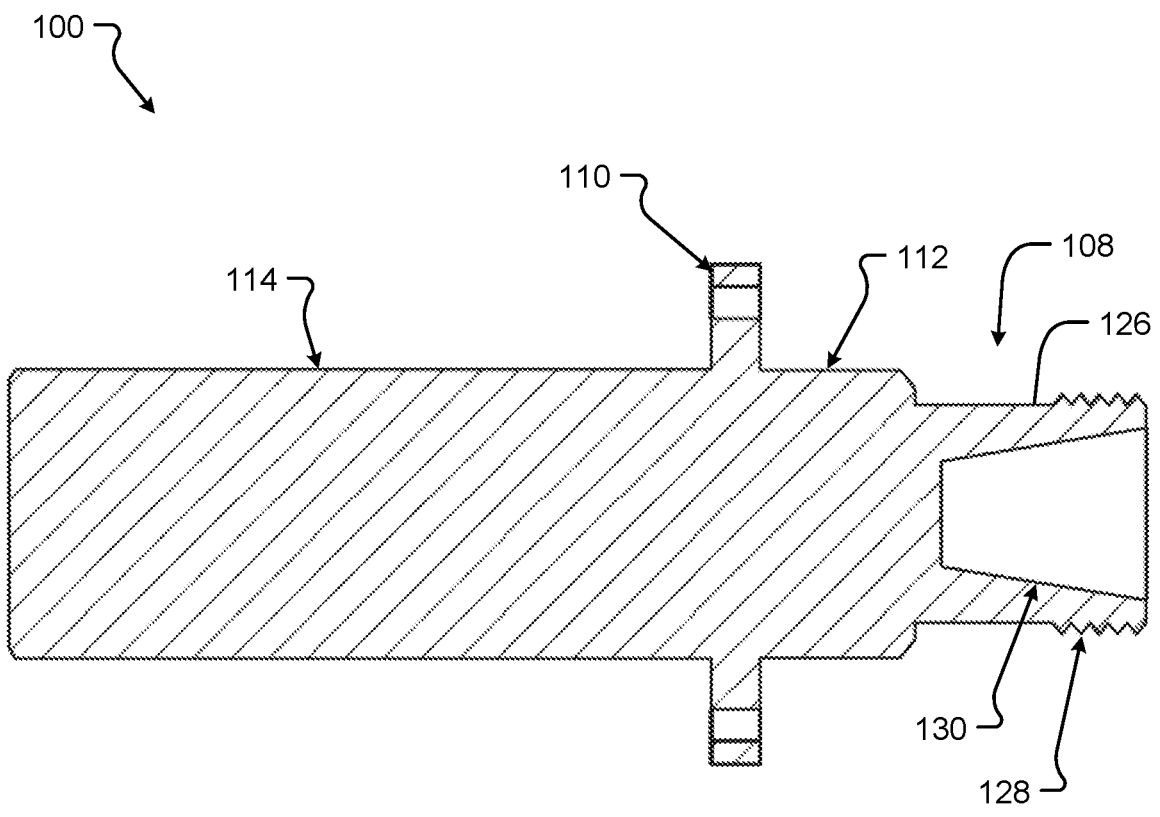
FIG. 4 is a cross-sectional side view of an adapter taken along line A-A shown in FIG. 2 according to at least one embodiment of the present disclosure.
Figure 5:
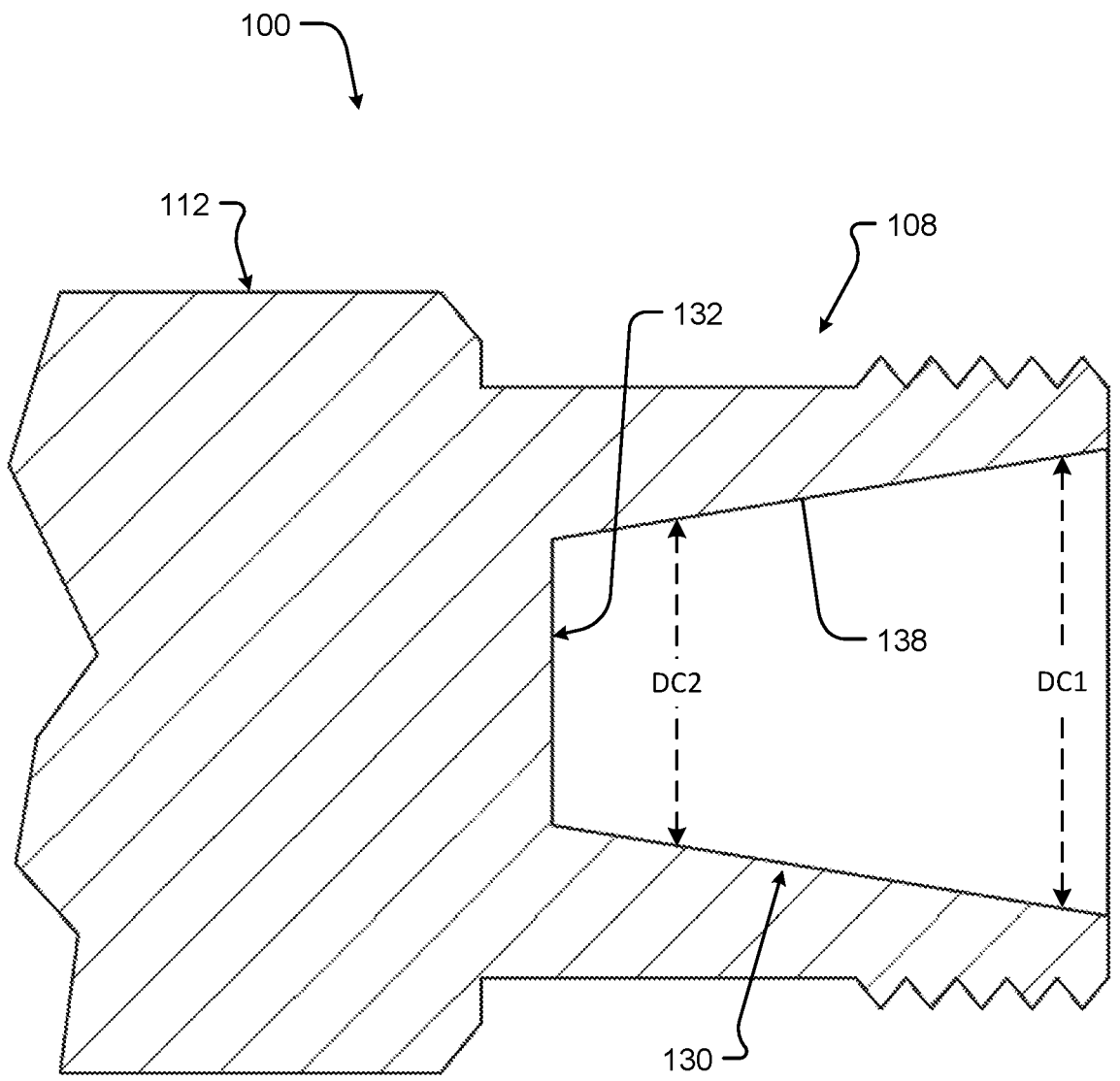
FIG. 5 is a detailed view of the adapter of FIG. 4 according to at least one embodiment of the present disclosure.

Turning to FIGS. 4 and 5, a side cross-sectional view of the adapter 100 taken from line A-A shown in FIG. 2 and a detailed view of the side cross-sectional view, respectively, are shown. As previously described, the collet holder 108 is configured to receive the collet 118, which is configured to hold a tool. The tool can comprise, for example, a drill bit, an end mill, a lapping tool, a sanding tool, or any other tool capable of cutting, milling, sawing, parting, sanding, or the like. The collet holder 108 has a threaded surface 128 on at least part of an outer surface 126 of the collet holder 108. The collet holder 108 also has a cavity 130 configured to receive the collet 118. As shown in FIG. 5, the cavity 130 tapers from a larger diameter DC1 at the opening 116 of the adapter 100 to a smaller diameter DC2 at a base 132 of the cavity 130. In some embodiments, DC1 is between about 0.9 inches and about 1.1 inches and DC2 is between about 0.6 inches and about 0.7 inches. In other instances, DC1 may be less than 0.9 inches or greater than 1.1 inches and DC2 may be less than 0.6 inches or greater than 0.7 inches. DC1 and DC2 may also be equal; in other words, the cavity 130 may not be tapered. It will be appreciated that the cavity 130 may be shaped to receive a collet 118 of any shape or size, e.g., multi-sided, cylindrical, oval, etc. as would occur to a person of skill in the art upon review of this disclosure. In the illustrated embodiment, the cavity 130 comprises an inner surface 138 that is smooth. In other embodiments, it will be appreciated that the inner surface 138 may have multiple sides or faces. When the collet 118 is positioned in the cavity 130, a collet ring 134 (shown in FIG. 6) may be threaded onto the threaded surface 128 of the collet holder 108 to releasably secure the collet 118 to the collet holder 108. In other instances, the collet ring 134 may be releasably coupled to the collet holder 108 using, for example, adhesives or fasteners such as bolts, screws, rivets, or the like.

Figure 6:
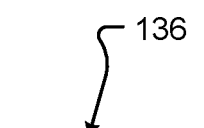
FIG. 6 is another cross-sectional side view of an adapter taken long A-A shown in FIG. 2, a collet, and a collet ring according to at least one embodiment of the present disclosure.
Figure 6:
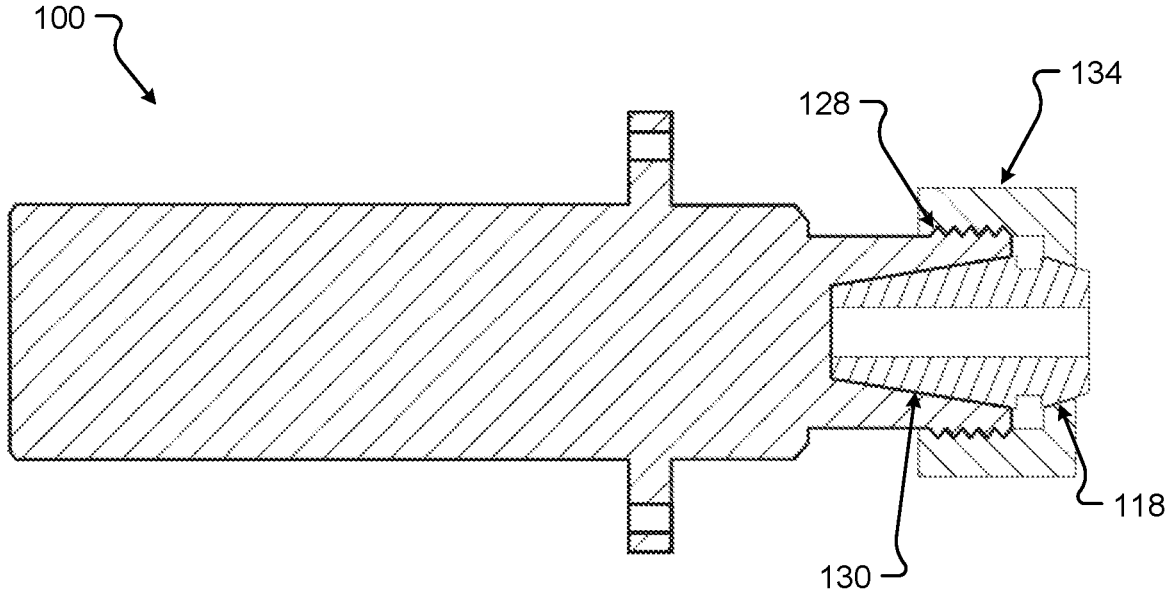
Figure 7:
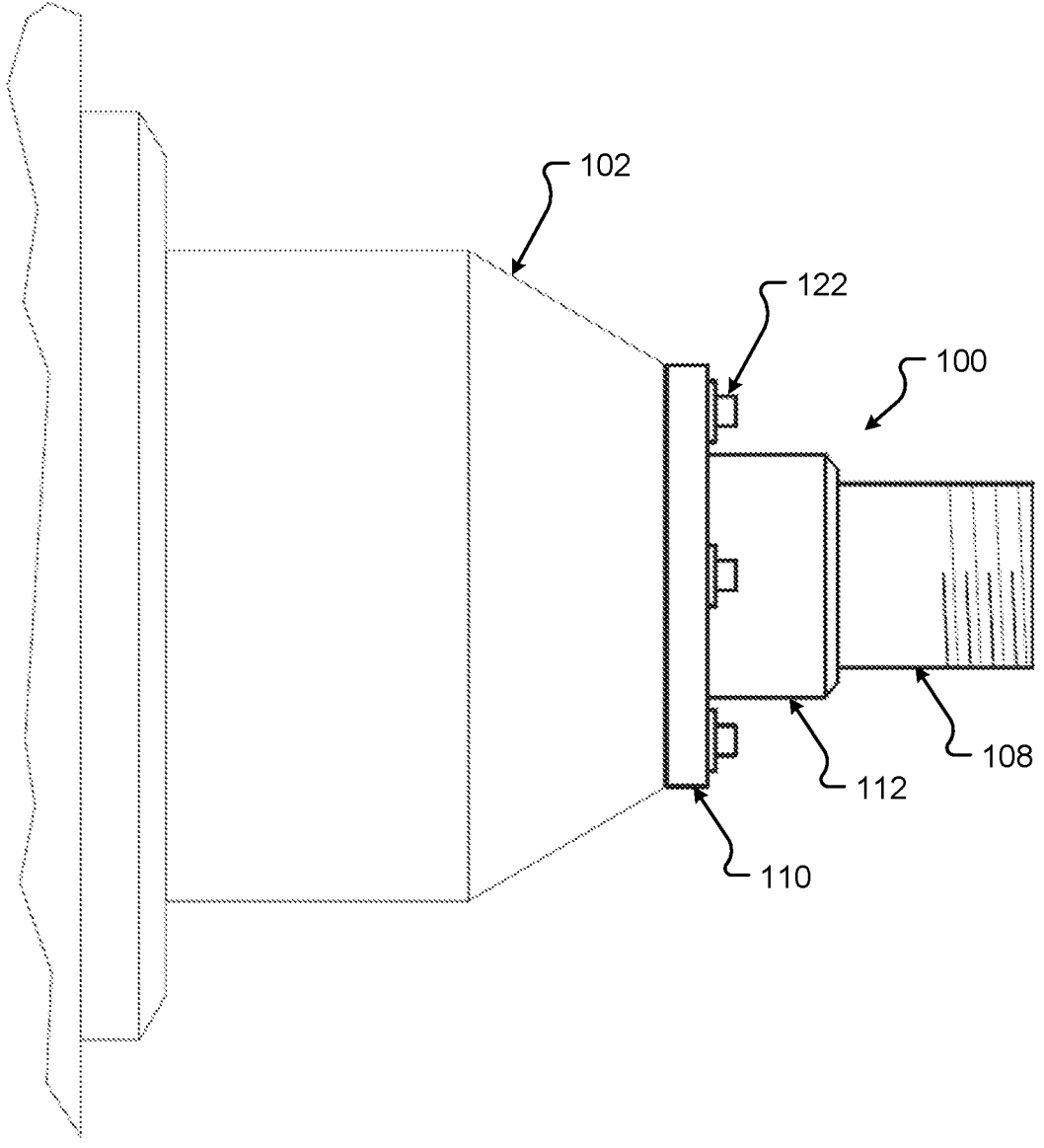
FIG. 7 is a side view of an adapter installed in a welding held according to at least one embodiment of the present disclosure.

Turning to FIGS. 6 and 7, a side cross-sectional view of the adapter 100 taken from line A-A shown in FIG. 2 with the collet 118 and the collet ring 134, and a side view of the adapter 100 installed in the welding head 102 are respectively shown. The adapter 100, the collet 118, and the collet ring 134 form a system 136 for adapting a welding machine for drilling, milling, etc. As previously described, the collet 118 is received in the cavity 130 of the collet holder 108, as shown in FIG. 6, and the collet ring 134 is threaded onto the threaded portion 128 of the collet holder 108 to releasably secure the collet 118 to the collet holder 108. Prior to the tightening the collet ring 134 to an operational torque, a tool may be inserted into the collet 118 and the collet ring 134 may be then tightening to the operational torque, thereby tightening the collet 118 over the tool. As shown in FIG. 7, the second body portion 114 (e.g., the receiving portion) may be received by the welding head 102. The one or more fasteners 122 may be used to selectively secure the adapter 100 to the welding head 102. As previously described and now shown, the flange 110 is configured to abut the welding head 102 when the adapter 100 is received by the welding head 102.

Aspects of the foregoing eliminates problems associated with conventional adapters by adapting the collet to eliminate set screws. The adapter as described herein also allows the weld head to be secured "flush" against the work piece, thereby reducing or eliminating eccentric or off-axis rotation of the cutter, end mill, drill bit, etc. Moreover, because the adapter can be used in association with existing friction stir welding tools and systems, the adapter enables automation of the drilling process using software like that used to automate the friction stir welding process, thereby eliminating the drawbacks of cutting/drilling by human technicians.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for adapting a welding machine for at least one of drilling or milling, the welding machine having a welding head, comprising:
   an adapter having a first end and a second end, the adapter having a collet holder at the first end, the collet holder having a cavity to receive a collet, a flange immovably positioned between the collet holder and the second end, the flange having one or more apertures configured to receive a corresponding fastener to selectively secure the adapter to the welding head, a first body portion positioned between the collet holder and the flange, the first body portion being cylindrical in shape, and a second body portion positioned between the flange and the second end, the second body portion configured to be received in the welding head of the welding machine;
   a collet receivable in the cavity of the collet holder, the collet configured to hold a tool; and
   one or more fasteners configured to extend through the one or more apertures to secure the adapter to the welding head.

2. The system of claim 1, wherein the tool is at least one of a drill bit or an end mill.

3. The system of claim 1, wherein the second body portion is cylindrical.

4. The system of claim 1, wherein the first body portion comprises a first diameter, the collet holder is cylindrical in shape and comprises a second diameter, and the flange comprises a third diameter, and wherein the third diameter is greater than the first diameter and the second diameter, and the first diameter is greater than the second diameter.

5. The system of claim 4, wherein the second body portion defines a receiving portion configured to be received by a receiver of the welding head, wherein the flange is configured to abut and be fixedly secured to the welding head when the receiving portion is received by the receiver.

6. The system of claim 5, wherein the receiving portion has a fourth diameter and the fourth diameter is less than the first diameter.

7. The system of claim 1, wherein the second body portion is multi-sided.

8. The system of claim 1, wherein the first body portion comprises a first diameter, the collet holder comprises a second diameter, the flange comprises a third diameter, and the second body portion comprises a fourth diameter and wherein the third diameter is greater than the first diameter and the second diameter, the first diameter is greater than the second diameter, and the first diameter is equal to the fourth diameter.

9. The system of claim 1, further comprising a collet ring configured to releasably secure the collet to the collet holder.

10. The system of claim 1, wherein the collet holder has an outer surface and at least a portion of the outer surface is threaded, and wherein the collet holder has a cavity configured to receive the collet, and wherein the collet ring threads onto the outer threaded surface to releasably secure the collet to the collet holder.

11. The system of claim 10, wherein the cavity comprises a tapered surface.

12. A system for adapting a welding machine for drilling, the welding machine having a welding head, comprising:
   an adapter having a first end and a second end, the adapter having a collet holder at the first end, the collet holder having an internal cavity, an outwardly extending flange positioned closer to the first end than the second end, the flange having one or more apertures each configured to receive a corresponding fastener, the flange configured to abut the welding head, a first cylindrical body portion between the flange and the collet holder, and a second body portion positioned between the flange and the second end, the second body portion defining a receiving portion configured to be received by the welding head;
   a collet receivable in the internal cavity of the collet holder, the collet configured to hold a tool; and
   a collet ring configured to releasably secure the collet to the collet holder,
   wherein the adapter is selectively securable to the welding head when the receiving portion is received by the welding head, the flange abuts the welding head and at least one fastener extends through the one or more apertures in the flange to engage the welding head.

13. The system of claim 12, wherein the second body portion is cylindrical.

14. The system of claim 12, wherein the first body portion defines a supporting portion comprising a first diameter, the collet holder comprises a cylindrical shape having a second diameter, and the flange comprises a third diameter, and wherein the third diameter is greater than the first diameter and the second diameter, and first diameter is greater than the second diameter.

15. The system of claim 12, wherein the first body portion defines a supporting portion comprising a first diameter, the collet holder comprises a second diameter, and the flange comprises a third diameter, the third diameter is greater than the first diameter and the second diameter, and the first diameter is equal to the second diameter.

16. The system of claim 12, wherein the first body portion defines a first diameter, the second body portion defines a receiving portion having a fourth diameter and, wherein the fourth diameter is less than the first diameter.

17. The system of claim 12, wherein the first body portion defines a first diameter, the second body portion defines a receiving portion having a fourth diameter and, wherein the fourth diameter is equal to or greater than the first diameter.

18. A system for adapting a welding machine for drilling comprising:
   a circumferential welder having a weld head configured to receive one or more welding tools;
   an adapter configured to be releasably secured by the welding head, the adapter having a first end and a second end, a collet holder at the first end, the collet holder having an internal cavity, an outwardly extending flange positioned closer to the first end than the second end and immovably fixed between the first end and the second end, the flange having one or more apertures configured to receive a corresponding fastener to selectively secure the adapter to the welding head, a first body portion between the flange and the collet holder, and a second body portion positioned between the flange and the second end;

one or more fasteners configured to extend through the one or more apertures to secure the adapter to the welding head;

a collet receivable in the internal cavity of the collet holder, the collet configured to hold a tool; and a collet ring configured to releasably secure the collet to the collet holder, wherein the second body portion defines a receiving portion configured to be received by a welding head, wherein the adapter is selectively securable to the welding head when the receiving portion is received by the welding head, the flange abuts the welding head, and one or more fasteners extend through the one or more apertures in the flange to engage the welding head.

* * * * *